United States Patent [19]

Rahimi et al.

[11] Patent Number: 5,621,591
[45] Date of Patent: Apr. 15, 1997

[54] DUAL COIL VOICE COIL MOTOR

[75] Inventors: Alireza Rahimi, Los Altos; Kamran Oveyssi, Aptos, both of Calif.

[73] Assignee: Seagate Technology, Inc., Scotts Valley, Calif.

[21] Appl. No.: 628,453

[22] Filed: Apr. 5, 1996

[51] Int. Cl.$^6$ .................................................. G11B 5/55
[52] U.S. Cl. ............................................................ 360/106
[58] Field of Search ........................... 360/97.01, 98.01, 360/103–106

[56] References Cited

U.S. PATENT DOCUMENTS

| | | | |
|---|---|---|---|
| 4,587,714 | 5/1986 | Morris | 29/594 |
| 4,839,679 | 6/1989 | Cameron et al. | 354/234.1 |
| 4,967,296 | 10/1990 | Wiens et al. | 360/106 |
| 5,070,423 | 12/1991 | Gloski | 360/106 |
| 5,134,532 | 7/1992 | Svendsen et al. | 360/106 |
| 5,267,110 | 11/1993 | Ottesen et al. | 360/106 |
| 5,295,031 | 3/1994 | Wasson | 360/106 |
| 5,325,252 | 6/1994 | Yagi et al. | 360/106 |
| 5,432,663 | 7/1995 | Ichihara | 360/106 |
| 5,448,437 | 9/1995 | Katahara | 360/106 |
| 5,486,965 | 1/1996 | Yoshida et al. | 360/106 |

FOREIGN PATENT DOCUMENTS

| | | | |
|---|---|---|---|
| 4-146576 | 5/1992 | Japan | 360/104 |
| 5-74071 | 3/1993 | Japan | 360/105 |
| 5-128753 | 5/1993 | Japan . | |

Primary Examiner—Jefferson Evans
Attorney, Agent, or Firm—LaRiviere, Grubman & Payne

[57] ABSTRACT

A head-arm assembly having a pair of trapezoidal-like shaped coil bobbins for improved torque and moments of inertia in a voice coil motor (VCM) for a disk drive. The VCM includes a magnetic structure that employs three magnet polarity zones having two flux transition zones. The magnetic structure is able to employ relatively thin pole pieces without saturation or leakage. The thin pole pieces permit use of a thicker magnet in the same envelope size. The result is an increased flux density in the air gap of the VCM, giving higher torque and shorter access time. In addition to improving the torque and moments of inertia, the present invention allows use of thicker magnets (thinner pole pieces) and allows the option of using a thinner coil that is wider radially. In another version, an oval-shaped coil may be used for increased effective length when disposed within a magnetic field of a VCM.

1 Claim, 13 Drawing Sheets

PRIOR ART

PRIOR ART

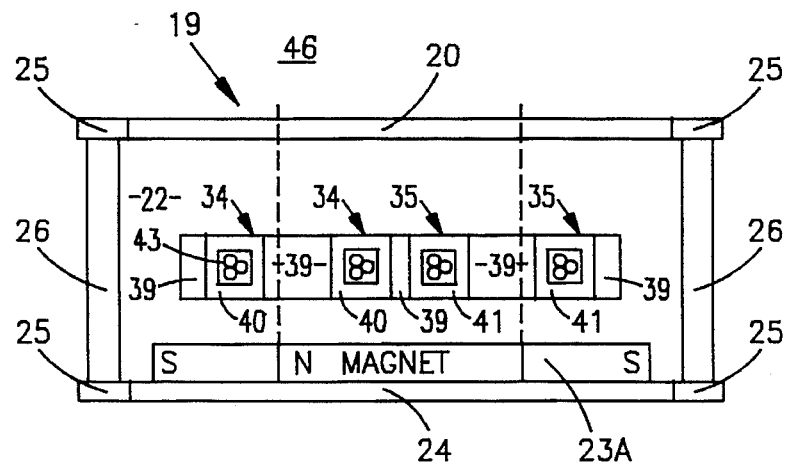
FIG. 8
FIG. 8A
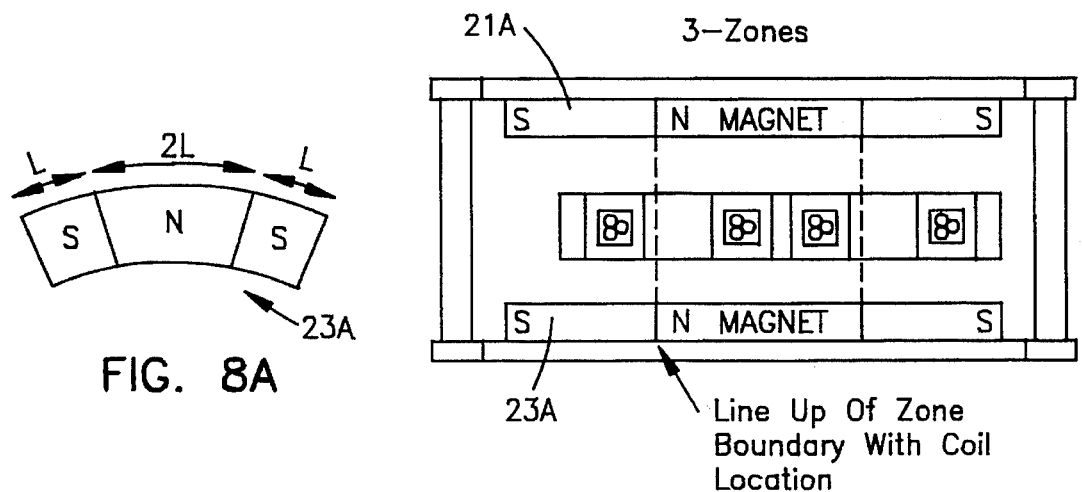
FIG. 9A
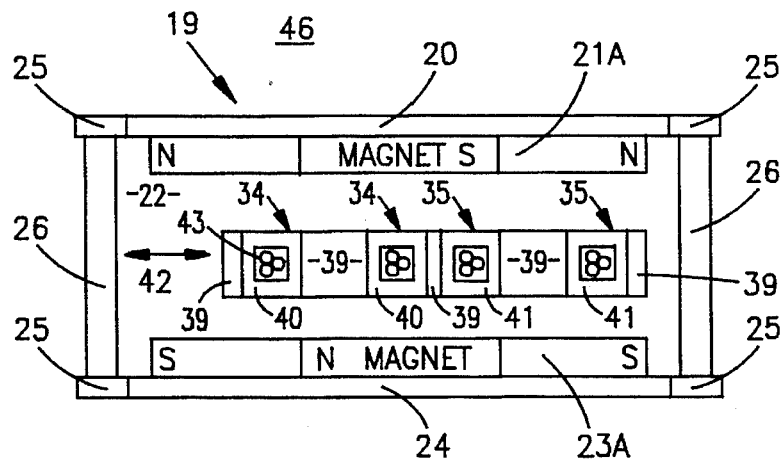
FIG. 9

50% Less Thickness 5,621,591

DUAL COIL VOICE COIL MOTOR

FIELD OF THE INVENTION

The present invention relates to improved actuators for disk drives and, more particularly, to improved voice coil motors used to actuate head arm assemblies in small form factor hard disk drives.

BACKGROUND OF THE INVENTION

Magnetic disk drives are becoming increasingly smaller in order to meet the portability requirements of notebook computers. Consequently, space is at a premium in all dimensions. As a result, there is a limited volume in which to employ a coil for a voice coil motor (VCM) for actuating a head-arm assembly.

Generally, rotary head actuators are used in the small disk drives associated with notebook computers. Head-arm assemblies are pivotally mounted about a fixed pivot shaft. One end of the arm carries the read/write head, and the other end of the arm is disposed in and forms part of a VCM. The VCM provides the pivotal motion of the head-arm assembly.

Moving a head-arm assembly from a first position to a second position with respect to a platter (disk) surface is a necessary feature of a disk drive. Providing an ability to move the head-arm assembly quickly and accurately (including mechanical stability) with low power consumption is a desirable goal. Having the ability to accurately position the head-arm assembly results in an increase in the number of tracks per inch (TPI) which may be employed.

Moreover, notebook computers are often used in mobile environments. Thus, displacement of a head-arm assembly owing to side loading must be severely restricted. Consequently, head-arm assemblies are made stiffer; in other words, more torque is required to pivotally move the head-arm assembly.

Therefore, it is desirable to provide a head-arm and VCM assembly which has increased torque over comparable prior art assemblies for the small volume available.

DISCLOSURE OF INVENTION

In one version of a voice coil motor in accordance with the present invention, two generally trapezoidal shaped coils are employed for coil bobbins. The magnetic structure employs three magnet polarity zones having two flux transition zones.

More specifically, a first and a second generally trapezoidal shaped coil bobbin are affixed to an arm provided as part of a head-arm assembly. The first and second coil bobbins are disposed side-by-side to one another so as to lie within an angular sector defined by said arm. The angular sector of the arm and the first and second bobbins are co-planar to one another so as to form a narrow side profile. The first and second coil bobbins each have a coil disposed therein formed by a wire. Each of the coils is wound in opposite directions such that additive torques are produced.

Due to the number of magnet polarities (3), the flux distribution in the upper and lower pole pieces is more uniform. Since the flux is not concentrated at the middle of the pole piece thickness, it is possible to reduce the thickness of the pole pieces without causing flux saturation or flux leakage. This allows use of a thicker magnet for the same envelope size, giving shorter access time.

In a second version of a voice coil motor constructed in accordance with the principles of the present invention, a generally oval shaped coil bobbin is affixed to the arm and disposed within the sector so as to be co-planar therewith for forming a narrow side profile. The generally oval shaped coil bobbin design is employed to increase the effective length of its coil under a magnetic field with respect to the magnetic structure assembly.

Other features of the present invention are disclosed or apparent in the section entitled: "BEST MODE FOR CARRYING OUT THE INVENTION."

BRIEF DESCRIPTION OF THE DRAWINGS

For fuller understanding of the present invention, reference is made to the accompanying drawing taken in conjunction with the following detailed description of the Best Mode for Carrying Out the Invention. In the drawing:

FIG. 8 is a side elevation view partly in cross-section of a voice coil motor in accordance with the present invention.

FIG. 8A is a side view of the magnet of the voice coil motor of FIG. 8, showing its three zones, and indicating the relative length of the zones.

FIG. 9 is a side elevation view partly in cross-section of a different embodiment of a voice coil motor in accordance with the present invention.

FIG. 9A is a view of the magnetic circuit assembly of the voice coil motor of FIG. 9, showing its three zones, and how the zone boundaries align with coil location.

Figure 1:
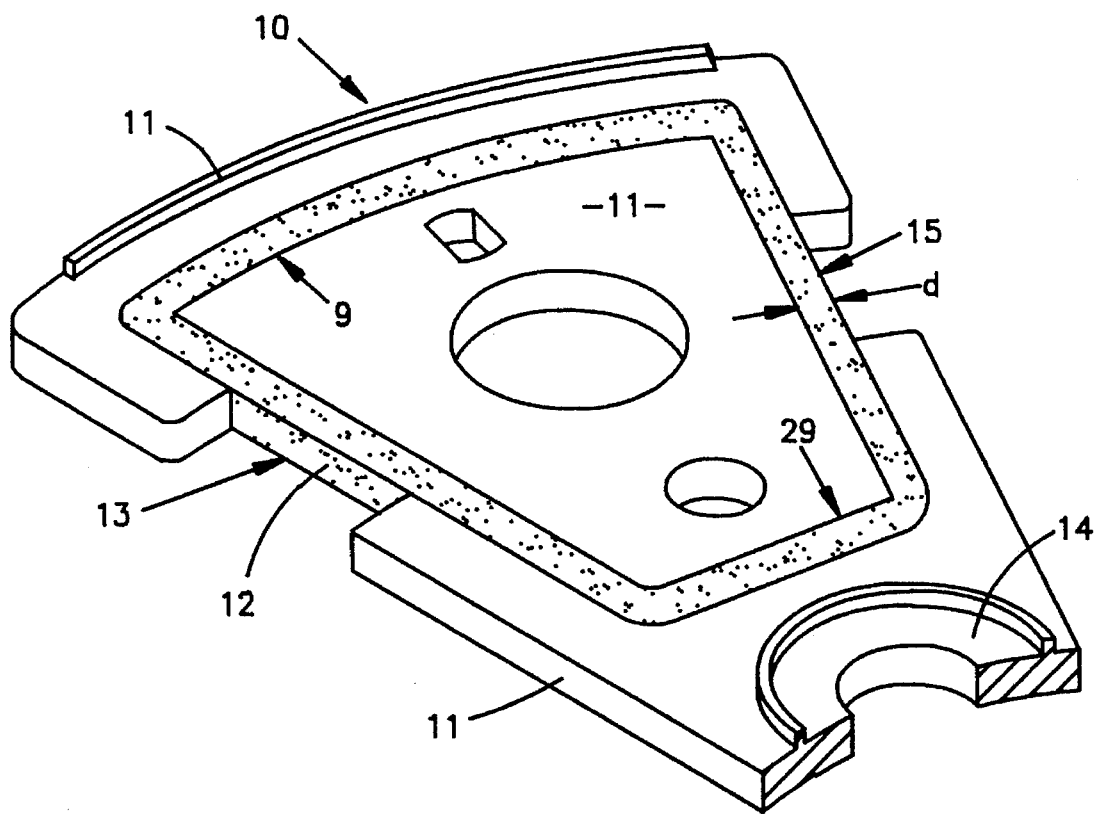
FIG. 1 is a fragmentary perspective view of a portion of a moveable head-arm assembly of the prior art.

Reference numbers refer to the same or equivalent parts of the present invention throughout the several figures of the drawing.

BEST MODE FOR CARRYING OUT THE INVENTION

As hard disk drives, disk surfaces, servocontrol systems, VCM actuators, and read/write heads are all known in the art, in order to avoid confusion while enabling those skilled in the art to practice the claimed invention, this specification omits some known details with respect to those items.

Referring now to FIG. 1, there is shown a fragmentary perspective view of a portion of a pivotally moveable head-arm assembly 10 of the prior art. Moveable head-arm assembly 10 includes arm 11 which is broken away through pivot 14. Arm 11 has a generally flat surface which is configured as an angular sector. A trapezoidal coil bobbin 12 is affixed to the flat surface of arm 11 by any conventional method, including but not limited to gluing or overmolding plastic. Bobbin 12 has a substantially uniform width, d. Coil bobbin 12 also includes a number of turns of a wire coil. In other words, there is one coil bobbin 12 having a single multi-turn coil of wire going upward on one side (for example, left side 13) and downward on the other side (for example, right side 15). The coil has n number of turns which go about sides 13, 15, 9, and 29. The starting and ending locations of the wire (not shown) are near to one another.

Figure 2:
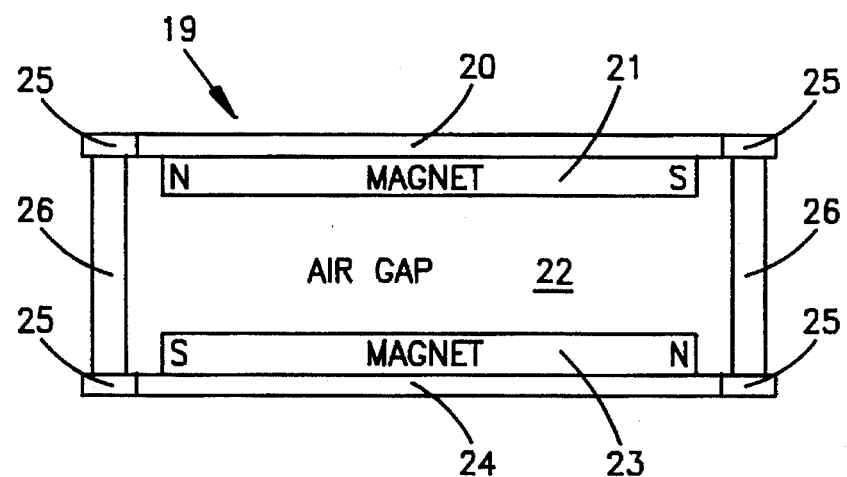
FIG. 2 is a side elevation view of a two-magnet design of a magnetic structure assembly of the prior art.
Figure 3:
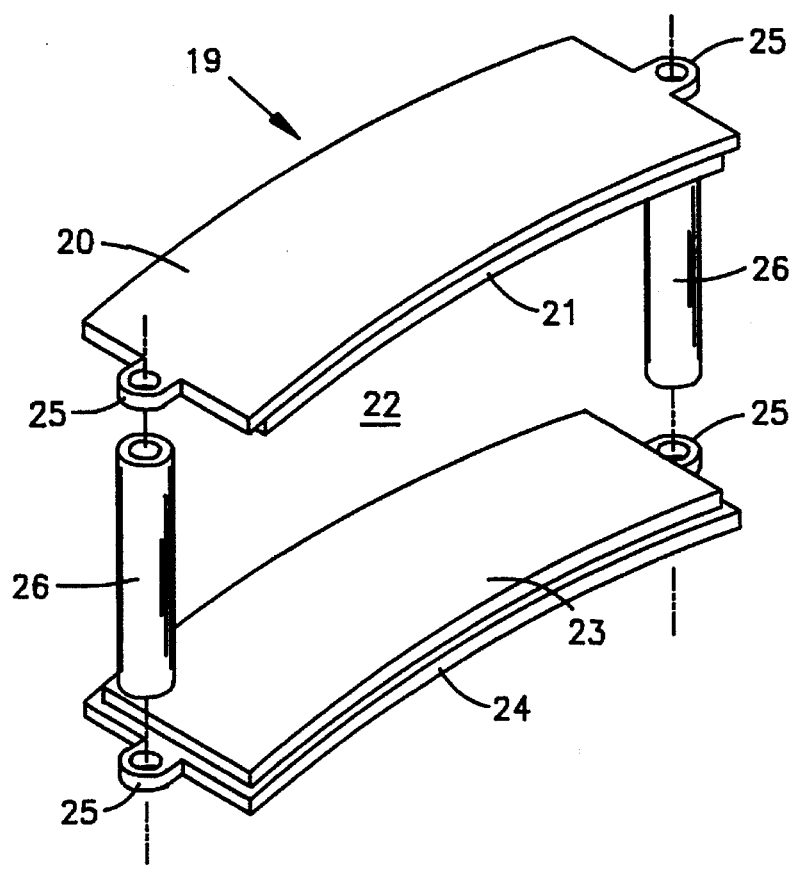
FIG. 3 is an exploded perspective view of the magnetic structure assembly shown in FIG. 2.

Referring now to FIGS. 2 and 3, FIG. 2 shows a side view of a two-magnet design of a magnetic structure assembly 19, while FIG. 3 shows an exploded perspective view thereof. Magnetic structure assembly 19 may employ either one or two magnets 21, 23. A two-magnet design as in FIGS. 2 and 3 has the performance advantage of a sharper flux transition zone for more usable travel in a given configuration, but it is more expensive than a one-magnet design. It would be advantageous to obtain the usable travel of a two-magnet configuration in a one-magnet design as this would reduce vertical profile (height) requirements and, thus, result in a thinner voice coil motor.

As shown in FIGS. 2 and 3, magnetic structure assembly 19 is constructed in layers. Upper pole piece 20 forms a top layer to which is affixed upper magnet 21. Air gap 22 separates upper magnet 21 from lower magnet 23 which is affixed to lower pole piece 24. Magnets 21, 23 are bipolar permanent magnets. Consequently, magnetic flux changes from one polarity, through zero flux, to the opposite polarity. This results in a flux transition zone in approximately the center of the air gap 22. If the magnetic structure assembly 19 is ideally symmetric in all aspects, then the flux transition zone will be located exactly in the center of the air gap 22.

Pole pieces 20, 24 may be made of steel, and are provided with mounting flanges 25 for connecting magnetic structure assembly 19 together using standoffs 26 and fasteners such as screws (not shown).

Figure 4:
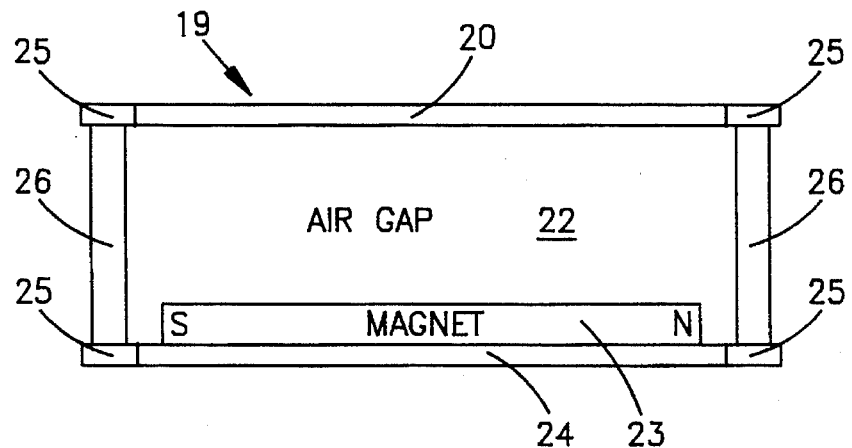
FIG. 4 is a side elevation view of a one-magnet design of a magnetic structure assembly of the prior art.

FIG. 4 shows a side view of a one-magnet design of a magnetic structure assembly 19 of the prior art. This embodiment is similar to that of FIGS. 2 and 3 except that it only has lower magnet 23, and thus the upper pole piece 20 completes the magnetic circuit for the lower magnet 23. The embodiments shown in FIGS. 2 and 4 are not intended to represent all possible magnetic structure assemblies in which the present invention may be employed. Consequently, it should be understood that the present invention may be practiced in embodiments of magnetic structure assemblies which are not specifically as described herein.

Figure 5:
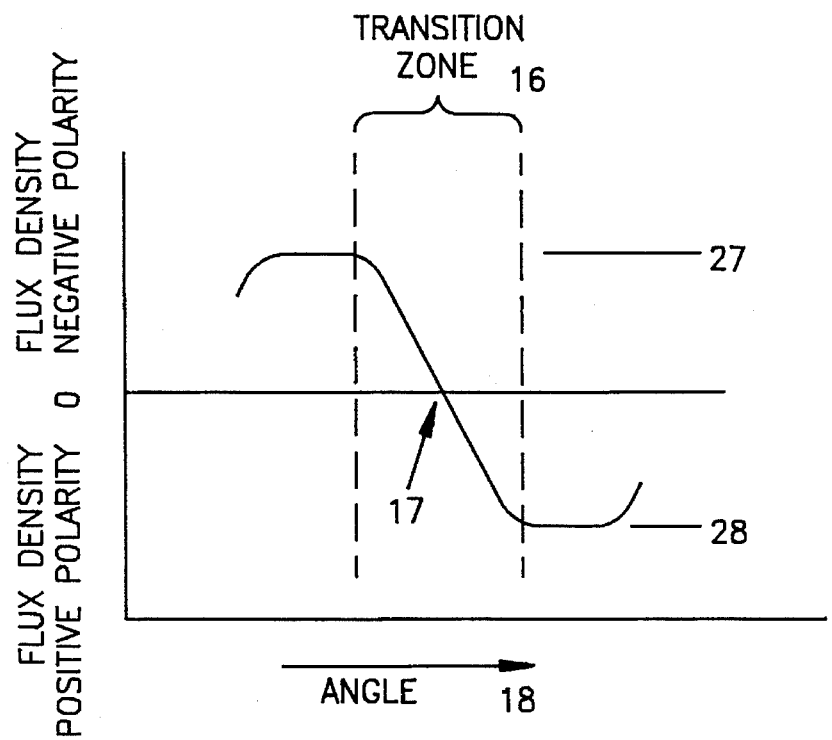
FIG. 5 is a graph showing a plot of flux density versus angle in an air gap of a magnetic structure assembly of the prior art.

FIG. 5 is a graph showing the plot of the flux density versus angle in the air gap 22 (shown in FIGS. 2, 3 and 4). As shown, transition zone 16 is defined as the location of transition from a first saturation level of flux density 27 to a second level of saturation of flux density 28 going through a zero flux density location 17. With continuing reference to FIG. 5 and renewed reference to FIGS. 2, 3, and 4, angle 18 is dependent upon positioning of coil bobbin 12 in the air gap 22. As is known, the coil bobbin 12 is moved in an arcuate or pivotal manner within the air gap 22. In other words, the head-arm assembly 10 is rotatably mounted by pivot 14 with the bobbin 12 disposed in the air gap 22 of the magnetic structure assembly 19. The flat surface of the head-arm assembly 10 is typically co-planar with the magnetic structure assembly 19. The multi-turn coil of wire wound on the bobbin 22 includes electrical connections (not shown) which enable the coil to carry a current thereby generating a magnetic field which interacts with the magnetic field created by one or more permanent magnets, e.g., both or either one of the permanent magnets 21, 23.

When current is passed through turns of the coil of the bobbin 12, if the left side 13 is in a magnetic field extending from north to south, then right side 15 will be in a magnetic field extending from south to north. Therefore, the current in the left side 13 will travel in one direction while the current in fight side 15 will travel in the opposite direction. Consequently, two additive torques are produced resulting in a stroke of the head-arm assembly 10. This stroke constant is measured in ounce-inches/ampere, and is represented by the symbol Kt.

The foregoing description with respect to FIGS. 1–5 relates to typical voice coil motors as employed heretofore in hard disk drives. As indicated hereinabove, there is a need for a head arm and VCM assembly which has increased torque over comparable prior art assemblies for the small volume available.

Figure 6:
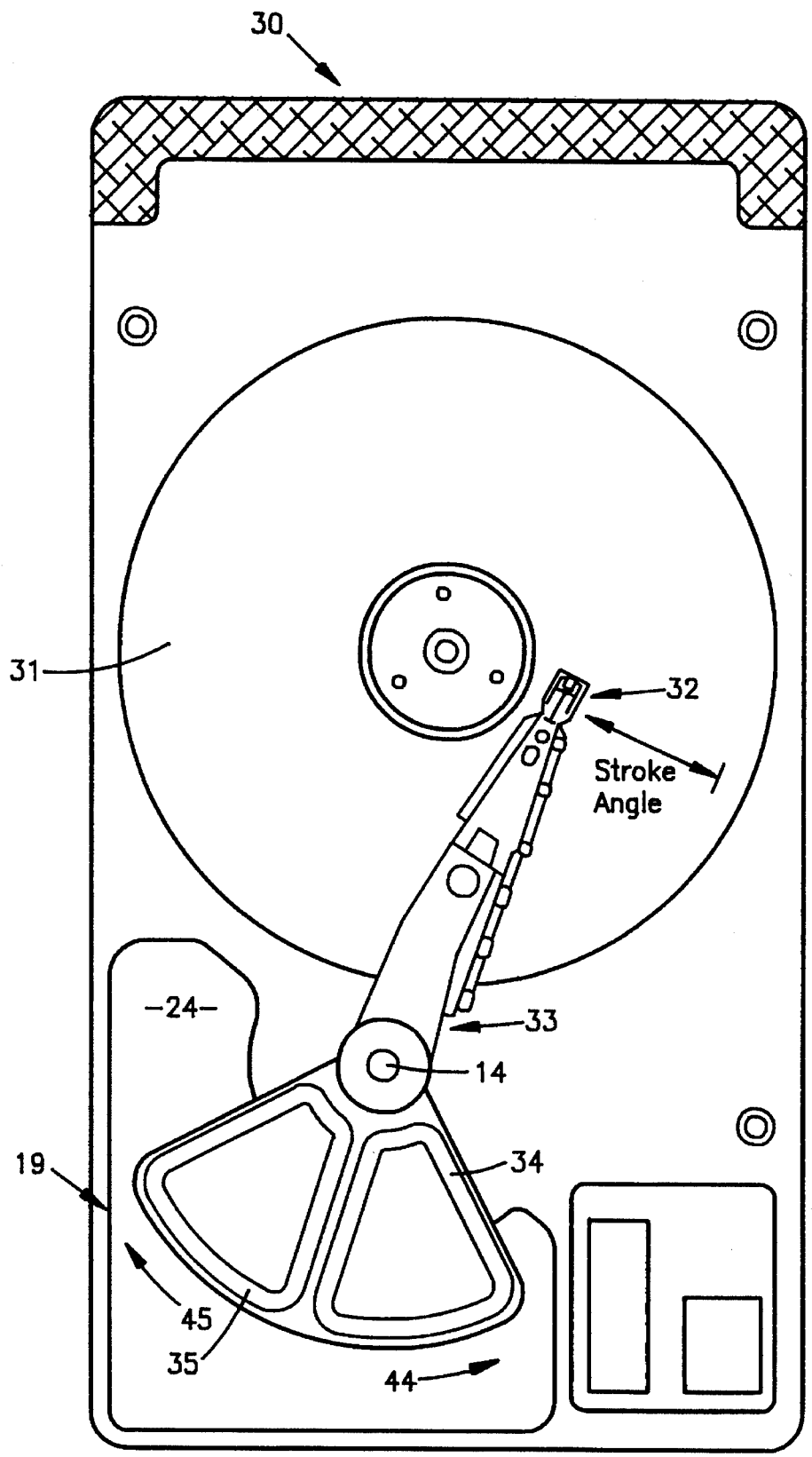
FIG. 6 is a top plan view of a hard disk drive having a top layer of a magnetic structure assembly cut away to expose a dual-coil head-arm assembly in accordance with the present invention.
Figure 7:
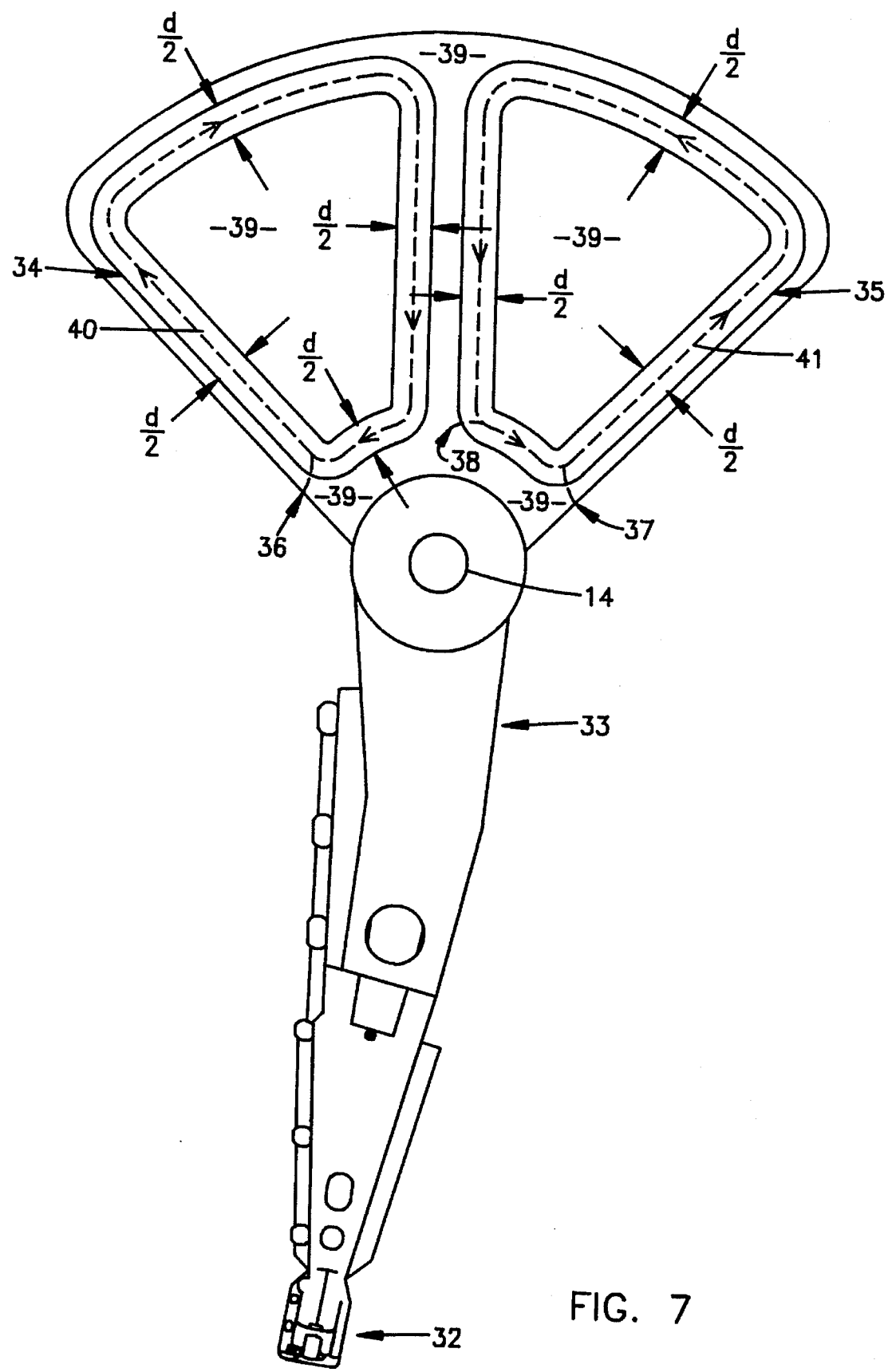
FIG. 7 is a top plan view of the dual-coil head-arm assembly shown in FIG. 6.

In accordance with the principles of the present invention, there is provided a novel dual coil voice coil motor that provides increased torque over comparable prior art assemblies for the small volume available. FIG. 6 is a top plan view of a hard disk drive having a top layer of a magnetic structure assembly cut away to expose a dual-coil head-arm assembly in accordance with the present invention. FIG. 7 is a top plan view of the dual-coil head-arm assembly shown in FIG. 6.

In a departure from the limitations of conventional single coil VCMs, the present invention provides a new direction in VCM design.

Figure 12:
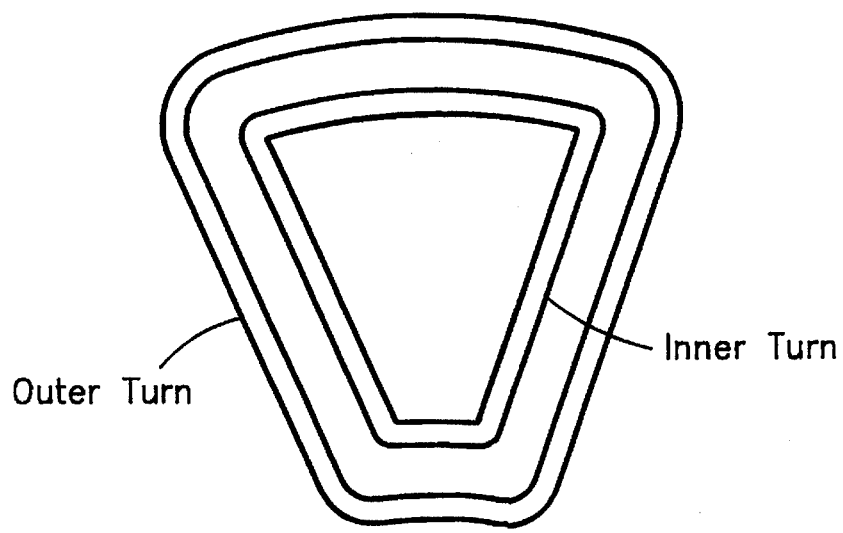
FIG. 12 is a plan view of a coil bobbin indicating the locations of an outer turn and an inner turn.

The dual-coil voice coil motor constructed in accordance with the principles of the present invention provides a coil width reduction on the order of fifty percent (50%) as compared with conventional VCMs. In a single coil bobbin, as shown in FIG. 12, the outer turns of the coil wire turns length are longer than the inner turns, therefore, the length of wire is longer, which produces more resistance. By reducing the coil width, the overall resistance decreases. Due to reduction of overall volume of the coil bobbin, the result is a lower first and second moment of inertia, and a lower resistance.

The dual-coil voice coil motor of the present invention requires increased magnet radial width. While the inner width is the same as in conventional VCMs, the outer arcuate length is increased over such conventional VCMs. Consequently, more useful area of coil may be located near to one or more permanent magnets of a magnetic structure assembly for a VCM.

Figure 13:
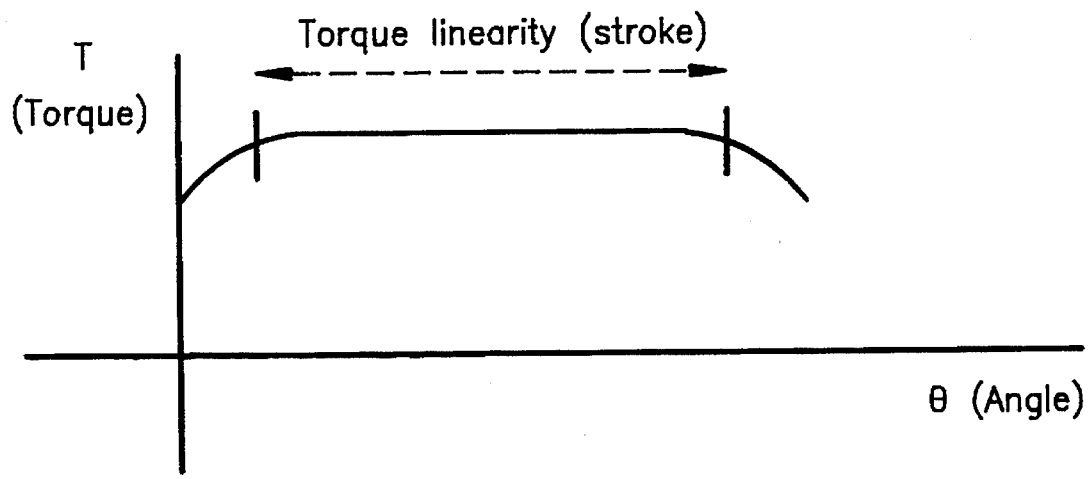
FIG. 13 is a graph of torque versus angle indicating torque linearity (stroke).
Figure 14:
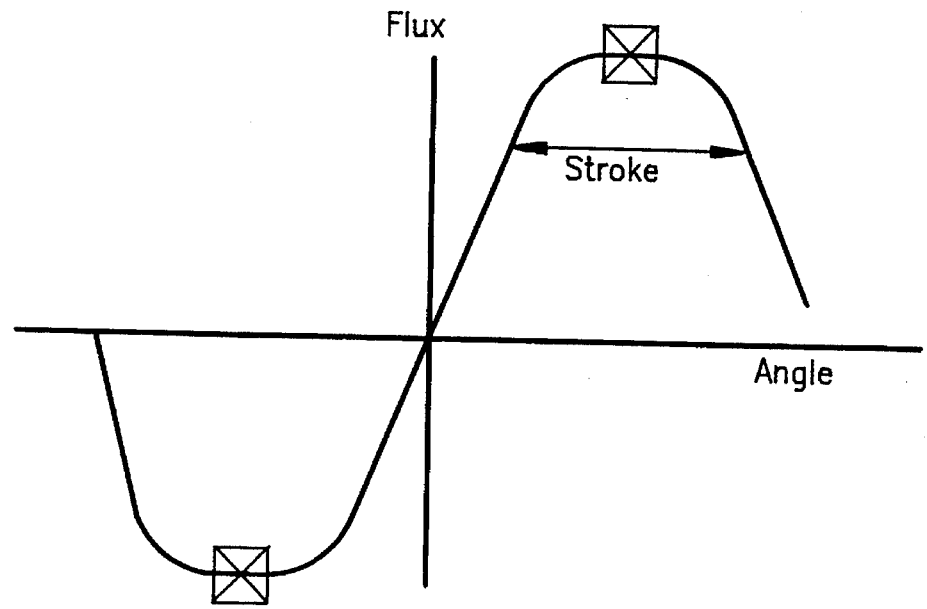
FIG. 14 is a graph of flux versus angle indicating that less coil moves into the magnet transition zone during stroke.

The dual-coil voice coil motor of the present invention provides an increase in torque constant and effective coil length with respect to one or more permanent magnets. The torque over the stroke-angle-linearity (constant torque) improves. Referring now to FIGS. 13 and 14, torque linearity versus angle depends on coil angle and coil leg width. As the coil leg width reduces, less coil moves into the magnet transition zone during the stroke.

The dual-coil voice coil motor constructed in accordance with the principles of the present invention also provides an increase in coil angle on the order of fifteen percent (15%) to thirty one percent (31%) over conventional VCMs. This requires larger magnet radial width.

Figure 15:
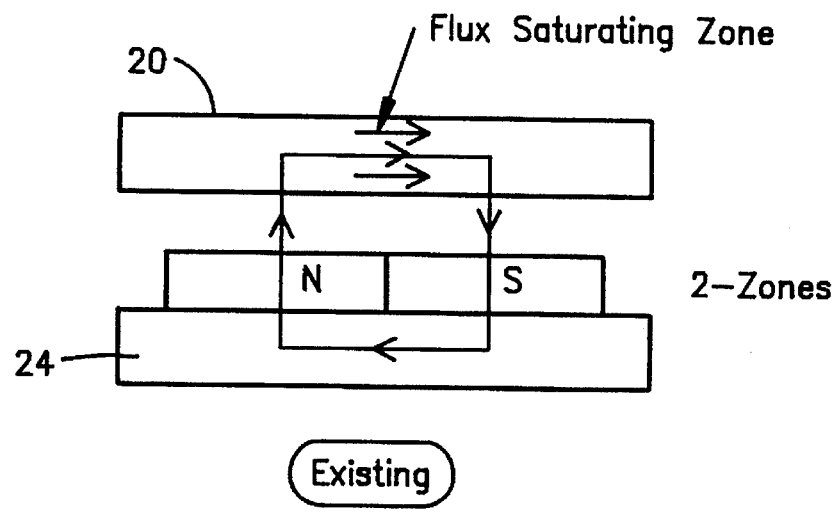
FIG. 15 is a diagram of a magnetic circuit illustrations two transition zones in conventional voice coil motors.
Figure 16:
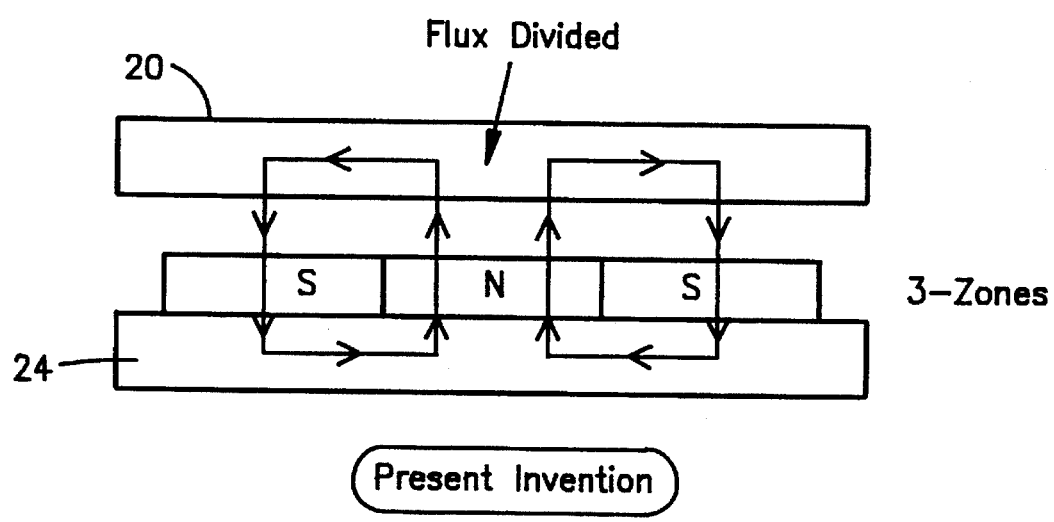
FIG. 16 is a diagram of a magnetic circuit illustrating three transition zones in a voice coil motor in accordance with the invention.
Figure 17:
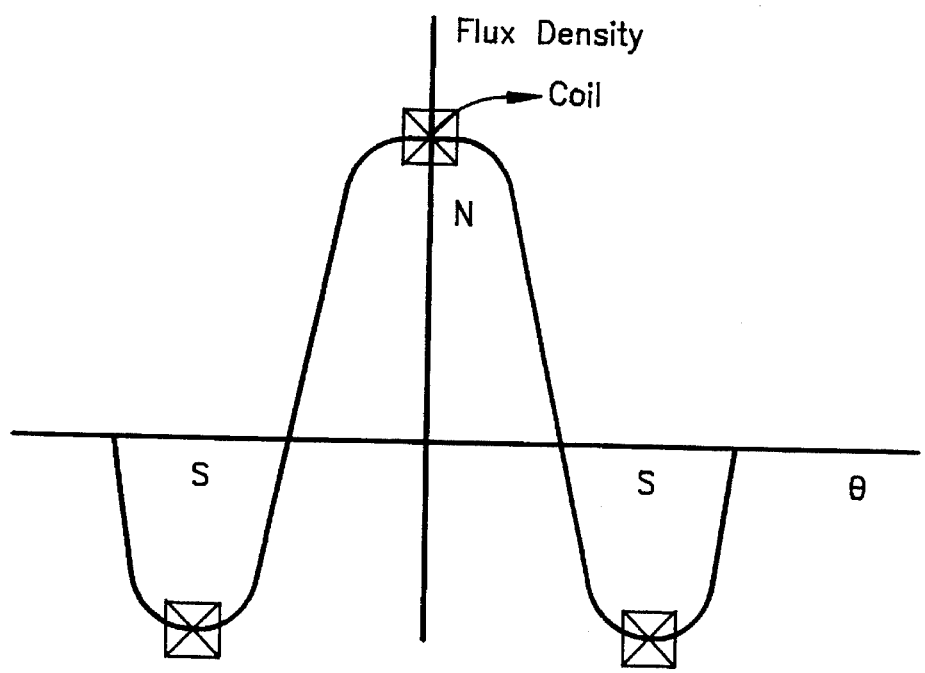
FIG. 17 is a graph of flux density versus angle in the air gap of the voice coil motor.
Figure 18:
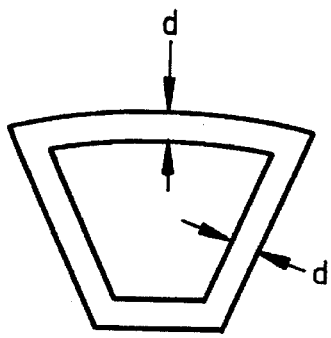
FIG. 18 is a plan view of a conventional single coil bobbin.
Figure 19:
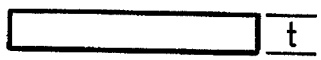
FIG. 19 is a top view of the bobbin of FIG. 18 showing the thickness thereof.
Figure 20:
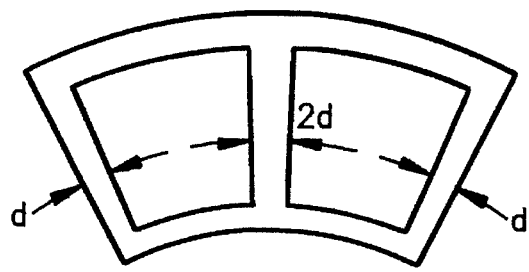
FIG. 20 is a plan view of a dual coil bobbin in accordance with the present invention.
Figure 21:
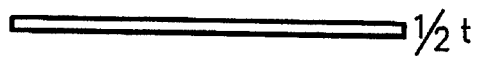
FIG. 21 is a top view of the dual coil bobbin of FIG. 20 showing the thickness thereof.

The dual-coil voice coil motor constructed in accordance with the principles of the present invention requires two transition zones instead of the single transition zone of conventional VCMs. Referring now to FIGS. 15 and 16, due to the number of magnet polarities (3), the flux distribution in the upper and lower pole pieces 20, 24 is more uniform. Since the flux is not concentrated at the middle of the pole piece thickness, it is possible to reduce the thickness of the upper and lower pole pieces 20, 24 without flux saturation in the upper and lower pole pieces 20, 24 or flux leakage. This allows, with the same envelope (height), as in a conventional VCM, a thicker magnet to be used, and therefore increases the flux density in the VCM air gap (higher torque, shorter access time) as shown in FIG. 17.

There is a second coil geometry option that involves distribution of the coil wire by allowing the same width as the single VCM coil, but 50% less thickness. Referring now to FIGS. 18–21, the reduced thickness of the coil allows an increase in the magnet thickness to increase the air gap flux density, or increasing the thickness of the pole pieces 20, 24 to reduce the flux leakage, or both.

The dual-coil voice coil motor constructed in accordance with the principles of the present invention also is not limited to a one-to-one ratio of coil angle to torque dropoff at the inside diameter (ID) and outside diameter (OD) of the stroke angle as are conventional VCMs. Rather, the present invention provides the ability to change ratio of the coil angle to change the torque dropoff at the ID or OD as desired for different VCM envelopes.

Referring back to FIG. 6, the dual-coil voice coil motor of the present invention will be described in detail. A hard disk drive 30 has a top portion of magnetic structure assembly 19 removed in order to expose dual coil bobbins 34, 35 of a VCM in accordance with the present invention. Head-arm assembly 33 includes read/write heads 32 and dual coil bobbins 34, 35 in accordance with the present invention. Head-arm assembly 33 pivots at pivot 14, and therefore may be moved in either direction 44 or 45.

FIG. 7 shows the head-arm assembly 33 of FIG. 6. Each coil bobbin 34, 35 has a width which is half that of the prior art, namely, d/2. This width is substantially uniform along the entire perimeter of each coil bobbin 34, 35. Each coil bobbin 34, 35 is disposed in upper arm portions 39 of head-arm assembly 33. In each coil bobbin 34, 35, there is shown a dash line having arrows to indicate wire coil. As indicated by the arrows in the dashed lines, the wire coil travels in a clockwise direction for coil bobbin 34 and a counter-clockwise direction for coil bobbin 35. The wire has two ends 36, 37. Ends 36, 37 are for attachment to a power source (servo motor control) for energizing coil bobbins 34 and 35. A single wire is used for winding both coil bobbins 34 and 35. Consequently, a bridge 38 of wire is used. In this manner, a single strand of wire may be used to provide a multi-turn coil for coil bobbins 34 and 35. In accordance with the present invention, there are n/2, or one-half the number of turns employed in accordance with the teachings of the present invention as compared with prior conventional single coil VCMs.

Referring now to FIG. 8, there is shown a side, cross-sectional view of a VCM 46 in accordance with the present invention. As shown, disposed in air gap 22 of magnetic structure assembly 19 is upper arm portion 39 of head-arm assembly 33 (shown in FIG. 7). Coil bobbins 34, 35 include housings 40 and 41, respectively. Housings 40, 41 contain wire 43. Recall, wire 43 is one strand of wire which is wrapped to provide two coils having n/2 turns each.

Referring to FIG. 8A, the magnet 23A has three zones: a south pole, a north pole and a south pole. The south poles have a length L, and the north pole has a length 2L. There are three zone boundaries or transitions, as opposed to two in the single coil VCM. The area of the north pole is twice the area of each south pole.

Referring now to FIG. 9, there is shown another version of a voice coil motor 47 in accordance with the present invention. VCM 47 of FIG. 9 is similar to that of VCM 46 of FIG. 8, except that two permanent magnets 21A, 23A are used instead of one. Also, directions 42 are to indicate that upper arm portion 39 is moveable within air gap 22 in a lateral, arcuate manner.

As shown in FIG. 9A, the upper magnet 21A and the lower magnet 23A each have three zones: a south pole, a north pole and a south pole. The south poles have a length L, and the north poles have a length 2L. There are three zone boundaries or transitions, as opposed to two in the single coil VCM.

Figure 10:
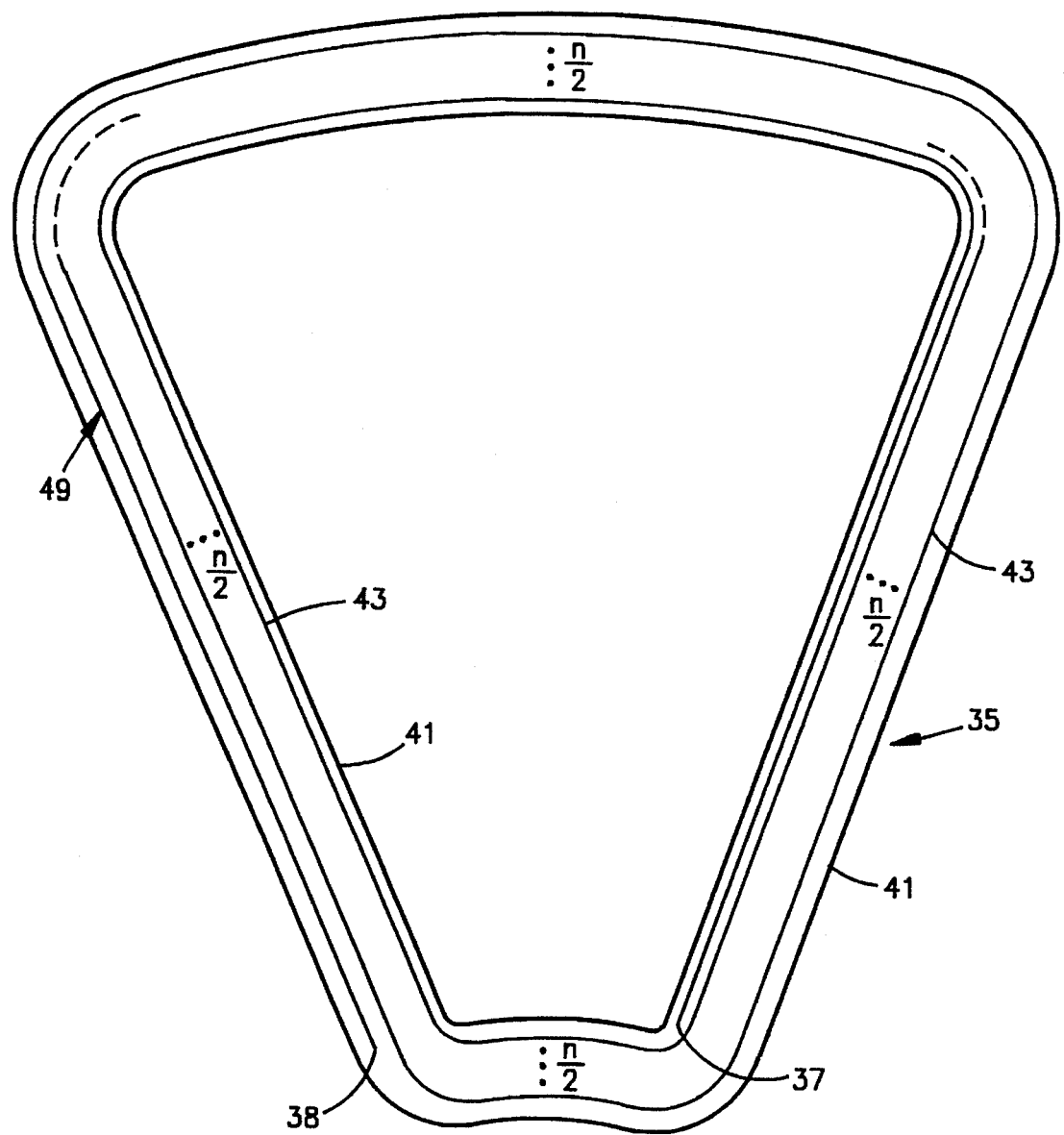
FIG. 10 is a top plan view of a coil bobbin having a top layer cut away in order to expose a coil in accordance with the present invention.

Referring now to FIG. 10, there is shown a top plan view of coil bobbin 35 having a top portion removed in order to expose coil 49 in accordance with the present invention. Coil 49 comprises n/2 turns of wire 43. FIG. 10 shows the trapezoidal shaped bobbin 35.

Figure 11:
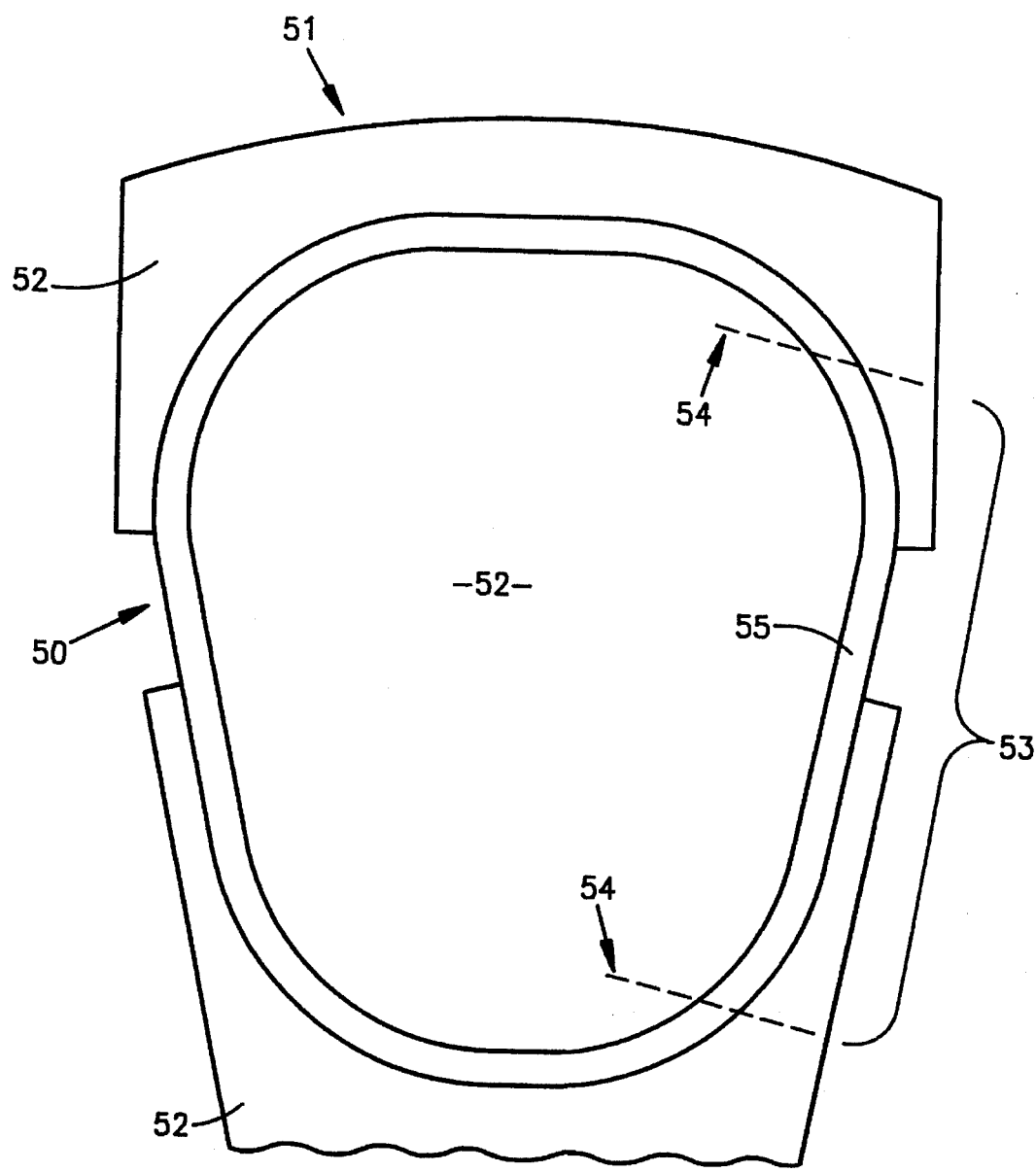
FIG. 11 is a top plan view of a generally oval shaped coil bobbin in accordance with the present invention.

FIG. 11 is a top view of a different version of a coil bobbin 50 having an oval shaped coil 55 in accordance with the present invention. Coil bobbin 50 is substituted for coil bobbin 12 of the prior art (shown in FIG. 1). Aside from coil bobbin 50, hard-arm assembly 51 includes arm 52, part of which is broken away. Dashed lines 54 are employed to indicate a relative extent of the magnetic field provided by magnets 21 and/or 23. Owing to arc length 53, the effective length, $L_e$, of the coil included in bobbin 50 is longer than an equivalent straight length of a prior art trapezoidal shaped coil bobbin 12 (shown in FIG. 1). A greater effective length of coil disposed in the magnetic field of the VCM is thus provided by the present invention.

Figure 22:
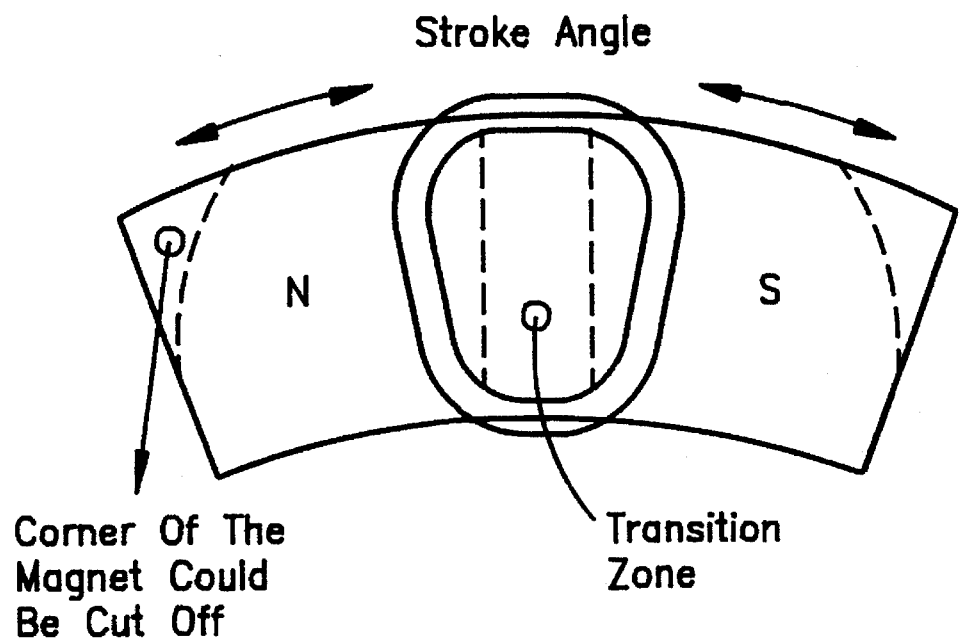
FIG. 22 is a view of a an oval coil bobbin adjacent the transition zone of a radially shortened magnet.
Figure 23:
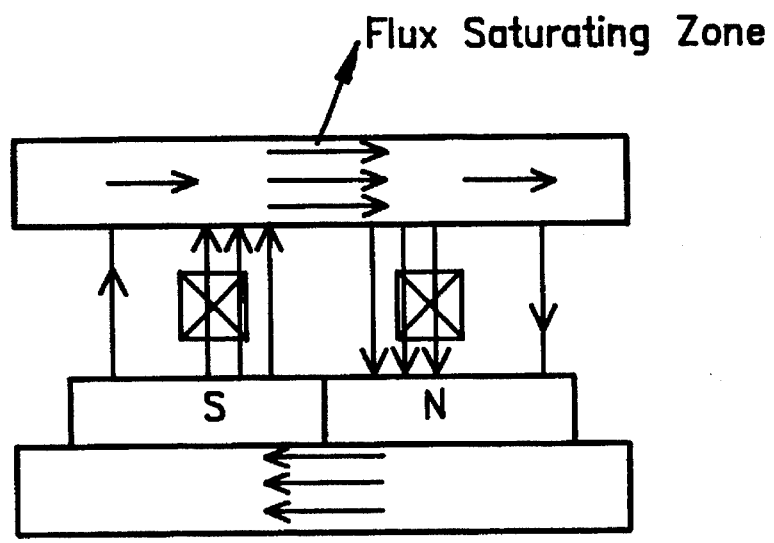
FIG. 23 is a view of the magnetic structure assembly of FIG. 22, indicating the flux paths and the flux saturating zone.

An oval shape coil has a number of advantages. Referring now to FIGS. 22 and 23, the magnet can be radially shorter without compromising torque linearity over stroke angle. The smaller magnet reduces the amount of flux density in the upper and lower pole pieces which will reduce the flux leakage or allow use of a thicker magnet. Shortening the outer arc portion of the coil results in lower inertia and lower resistance.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein.

What is claimed is:

1. A head-arm assembly comprising:

an arm having an angular sector;

a first and a second trapezoidal-like shaped coil bobbin affixed to the arm, the first and the second coil bobbin disposed side-by-side to one another so as to lie within the angular sector, the angular sector and the first and the second bobbin being co-planar to one another so as to form a narrow side profile, the first and the second coil bobbin each having a coil disposed therein formed by a wire, each said coil being wound in opposite directions to one another such that additive torques are produced; and a magnetic structure employing three magnet polarity zones, said magnetic structure having two flux transition zones, said magnetic structure employing relatively thin pole pieces without saturation or leakage to permit use of a thicker magnet that provides a shorter access time to said arm.

* * * * *